US009969392B2

(12) United States Patent
Fairgrieve et al.

(10) Patent No.: US 9,969,392 B2
(45) Date of Patent: May 15, 2018

(54) VEHICLE SPEED CONTROL SYSTEM

(71) Applicant: Jaguar Land Rover Limited, Whitley, Coventry, Warwickshire (GB)

(72) Inventors: Andrew Fairgrieve, Rugby (GB); James Kelly, Solihull (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 74 days.

(21) Appl. No.: 15/031,732

(22) PCT Filed: Oct. 21, 2014

(86) PCT No.: PCT/EP2014/072536
§ 371 (c)(1),
(2) Date: Apr. 23, 2016

(87) PCT Pub. No.: WO2015/059134
PCT Pub. Date: Apr. 30, 2015

(65) Prior Publication Data
US 2016/0244058 A1    Aug. 25, 2016

(30) Foreign Application Priority Data

Oct. 23, 2013   (GB) .................................. 1318707.5

(51) Int. Cl.
*B60W 30/14*  (2006.01)
*B60W 50/08*  (2012.01)
(Continued)

(52) U.S. Cl.
CPC ........ *B60W 30/143* (2013.01); *B60W 30/182* (2013.01); *B60W 50/085* (2013.01);
(Continued)

(58) Field of Classification Search
CPC ............. B60W 30/143; B60W 30/182; B60W 50/085; B60W 2550/143;
(Continued)

(56) References Cited

U.S. PATENT DOCUMENTS 5,553,453 A    9/1996   Coutant et al.
6,655,233 B2  12/2003   Evans et al.
(Continued)

FOREIGN PATENT DOCUMENTS

CN     1931643 A    3/2007
CN   101855116 A   10/2010
(Continued)

OTHER PUBLICATIONS

Combined Search and Examination Report corresponding to application No. GB1318707.5, dated Jun. 4, 2014, 5 pages.
(Continued)

*Primary Examiner* — Michael J Zanelli
(74) *Attorney, Agent, or Firm* — Reising Ethington P.C.

(57) ABSTRACT

A vehicle speed control system for controlling a vehicle having a plurality of wheels. The vehicle speed control system is configured to automatically control the speed of the vehicle in dependence on an input target set-speed. The system carries out a method that includes: applying torque to at least one of the plurality of wheels; receiving a user input of a target set-speed at which the vehicle is intended to travel; and applying torque to the at least one of the plurality of wheels for propelling the vehicle at a vehicle control speed. The system further controls the vehicle control speed as a function of at least one of the instantaneous vehicle speed and the terrain over which the vehicle is travelling.

19 Claims, 7 Drawing Sheets

(51) Int. Cl.
*B60W 30/182* (2012.01)
*B60W 50/00* (2006.01)

(52) U.S. Cl.
CPC .... *B60K 2310/24* (2013.01); *B60K 2310/244* (2013.01); *B60W 2050/0095* (2013.01); *B60W 2520/10* (2013.01); *B60W 2550/141* (2013.01); *B60W 2550/143* (2013.01); *B60W 2720/30* (2013.01)

(58) Field of Classification Search
CPC ....... B60W 2550/141; B60W 2520/10; B60W 2720/30; B60K 2310/244; B60K 2310/24
See application file for complete search history.

(56) References Cited

U.S. PATENT DOCUMENTS

| | | | |
|---|---|---|---|
| 7,349,776 B2 | 3/2008 | Spillane et al. | |
| 8,315,775 B2* | 11/2012 | Biondo | B60W 30/143 |
| | | | 180/170 |
| 8,620,558 B2 | 12/2013 | Johansson et al. | |
| 8,868,312 B2 | 10/2014 | Pedlar et al. | |
| 8,954,255 B1* | 2/2015 | Crawford | B60W 30/143 |
| | | | 701/70 |
| 9,132,836 B2 | 9/2015 | Johansson et al. | |
| 2004/0088098 A1 | 5/2004 | Muehlbauer et al. | |
| 2005/0114009 A1 | 5/2005 | Hellmann et al. | |
| 2007/0061059 A1 | 3/2007 | Inoue et al. | |
| 2010/0100281 A1 | 4/2010 | Huang | |
| 2010/0100295 A1 | 4/2010 | Inoue et al. | |
| 2011/0295457 A1 | 12/2011 | Linda et al. | |
| 2015/0321671 A1* | 11/2015 | Simmons | B60W 30/143 |
| | | | 701/48 |
| 2016/0023658 A1 | 1/2016 | Kelly et al. | |

FOREIGN PATENT DOCUMENTS

| | | |
|---|---|---|
| CN | 102458953 A | 5/2012 |
| CN | 102803039 A | 11/2012 |
| DE | 102006022080 A1 | 11/2007 |
| EP | 0876936 A1 | 11/1998 |
| EP | 1277992 A2 | 1/2003 |
| EP | 1355209 A1 | 10/2003 |
| EP | 1484213 A2 | 12/2004 |
| GB | 2499461 A | 8/2013 |
| GB | 2499657 A | 8/2013 |
| GB | 2514873 A | 12/2014 |
| JP | 2001263121 A | 9/2001 |
| JP | 2007077871 A | 3/2007 |
| JP | 2011255792 A | 12/2011 |
| JP | 2014091351 A | 5/2014 |
| WO | WO2008058945 A1 | 5/2008 |
| WO | WO2014139717 A1 | 9/2014 |

OTHER PUBLICATIONS

International Search Report corresponding to International application No. PCT/EP2014/072536, dated Feb. 16, 2015, 7 pages.
Written Opinion corresponding to International application No. PCT/EP2014/072536, dated Feb. 16, 2015, 12 pages.
International Search Report corresponding to International application No. PCT/EP2014/072537, dated Feb. 16, 2015, 5 pages.
Written Opinion corresponding to International application No. PCT/EP2014/072537, dated Feb. 16, 2015, 8 pages.
International Search Report corresponding to International application No. PCT/EP2014/072539, dated Feb. 16, 2015, 6 pages.
Written Opinion corresponding to International application No. PCT/EP2014/072539, dated Feb. 16, 2015, 8 pages.
Combined Search and Examination Report corresponding to application No. GB1418680.3, dated Mar. 31, 2015, 6 pages.
Combined Search and Examination Report corresponding to application No. GB1418681.1, dated Mar. 31, 2015, 8 pages.
Japanese Office Action in Japanese with English summary for JP application No. 2016-525992, dated Jul. 25, 2017, 5 pages.
Chinese Office Action in Chinese with English translation for CN application No. 201480058424.1, dated Nov. 3, 2017, 17 pages.

* cited by examiner

VEHICLE SPEED CONTROL SYSTEM

FIELD OF THE INVENTION

The invention relates to a system for controlling the speed of a vehicle. In particular, but not exclusively, the invention relates to a system for controlling the speed of a land-based vehicle which is capable of driving in a variety of different and extreme terrains and conditions, in particular in off road conditions.

BACKGROUND TO THE INVENTION

In known vehicle speed control systems, typically referred to as cruise control systems, the vehicle speed is maintained once set by the user without further intervention by the user so as to improve the driving experience for the user.

The user selects a speed at which the vehicle is to be maintained, and the vehicle is maintained at that speed for as long as the user does not apply a brake or, in some cases, the clutch. The cruise control system takes its speed signal from a driveshaft or wheel speed sensors. When the brake or the clutch is depressed, the cruise control system is disabled so that the user can change the vehicle speed without resistance from the system. If the user depresses the accelerator pedal the vehicle speed will increase, but once the user removes his foot from the accelerator pedal the vehicle reverts to the pre-set cruise speed.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly.

Such systems are usually operable only above a certain speed, typically around 15 mph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so. Known systems also cancel out of speed control upon detection of a vehicle wheel slip event.

It is also known to provide a control system for a motor vehicle for controlling one or more vehicle subsystems. U.S. Pat. No. 7,349,776, the content of which is hereby incorporated by reference, discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response® (TR) system or controller.

In co-pending patent application GB1314727.7, the entire contents of which are incorporated herein by reference a speed control system suitable for controlling the speed of a vehicle at lower speeds, in particular in off road environments is disclosed. This system uses the application of positive and negative torque to control the speed of a vehicle and contrary to known systems does not cancel the speed control function if a slip event is detected at one or more wheels, but instead manages the torque at the wheels to control the slip event and maintain progress of the vehicle. This type of system, or similar systems for controlling the speed of a vehicle is referred to herein as Low Speed Progress control (LSP)

The present invention seeks to improve upon the control of speed in off-road conditions, in particular when the vehicle is required to overcome obstacles.

SUMMARY OF THE INVENTION

Embodiments of the invention may be understood with reference to the appended claims.

Aspects of the present invention provide a system, a vehicle and a method.

According to a first aspect of the present invention, for which protection is sought, there is provided a vehicle speed control system for a vehicle having a plurality of wheels, the vehicle speed control system is configured to automatically control the speed of the vehicle to a vehicle control speed in dependence on an input target set-speed, the vehicle speed control system comprising: means for receiving a user input of a target set-speed at which the vehicle is intended to travel; means for applying torque to the at least one of the plurality of wheels for propelling the vehicle at the vehicle control speed; and means for controlling the vehicle control speed as a function of at least one of the instantaneous vehicle speed and the terrain over which the vehicle is travelling.

The various means comprising the invention may be embodied in electrical controllers. Each means may comprise an individual controller, may comprise a functional block within a multi-functional controller, or may comprise functional blocks within existing electronic controllers of the vehicle.

In this way the rate at which the speed to which the vehicle is controlled is limited in dependence upon the instantaneous speed of the vehicle. This can have significant benefits for the composure of the vehicle when driving off road.

One particular situation in which the vehicle speed control system is advantageous is when, for example, the vehicle is at a stand-still against an object, for example a log, curb, boulder etc. If the user turns on a low speed progress control (LSP), the vehicle may not begin to move immediately as a result of the torque build up required to overcome the object. The driver may then assume that LSP is not working or is unable to overcome the object without their intervention, and then attempt to force the vehicle to move by pressing a set + button to increase the LSP set speed to start the vehicle moving. Without the benefit of the disclosed vehicle speed control system it is possible that as a large amount of torque is needed to overcome the object, once it is overcome the vehicle may accelerate quickly as it attempts to reach its set speed, which the user has set higher than intended whilst waiting for the torque at the wheels to be sufficient to overcome the obstacle. This may lead to a reduction in vehicle composure.

In another scenario, if the driver has previously been driving with LSP switched on and has placed the LSP in a standby mode prior to slowing the vehicle to a standstill, if the driver presses a "resume" button of the LSP system to resume automatic speed control under LSP, depending on the previously set LSP set speed the effect may be the same as described above. This may be exasperated when driving over varied terrain, where the previously set LSP set speed may have been appropriate for relatively smooth terrain, but uncomfortable for rough terrain.

The means for propelling the vehicle at the vehicle control speed may include: means for determining a current speed at which the vehicle is travelling; means for comparing the current speed with the vehicle control speed and for providing an output indicative of the difference between the current speed and the vehicle control speed; and means for evaluating the torque to be applied to at least one of the vehicle wheels in dependence on said output and outputting a torque request signal in dependence thereon.

The vehicle control system may comprise a means of reducing the vehicle control speed as a function of the torque request signal. Said means for reducing the vehicle control speed as a function of the torque request signal may be configured to reduce said vehicle control speed as a function of the torque request signal if the instantaneous vehicle speed is less than a prescribed value. In one embodiment the prescribed value is in the range of 0 to 3 kilometers per hour.

In this manner where there is a large torque request combined with, for example a low speed (as would be the case when the vehicle is attempting to overcome an obstacle in its path), once the obstacle is overcome, as the vehicle control speed is controlled further in dependence on the torque request signal, i.e. it is limited to a lower value than the input target set-speed, the full torque at the wheels does not attempt to accelerate the vehicle immediately towards the target set-speed, but instead accelerates towards a lower vehicle control speed. As less acceleration is required to achieve this lower vehicle control speed, and as acceleration is controlled by vehicle torque request, as the vehicle control speed will be much closer to the current vehicle speed the torque request will reduce quickly (as less acceleration is required) and prevent loss of composure.

The means for controlling the vehicle control speed may be configured to control said vehicle control speed as a function of the terrain over which the vehicle is travelling in dependence on a signal indicative a user selected terrain mode.

Alternatively the means for controlling the vehicle control speed may be configured to control said vehicle control speed as a function of the terrain over which the vehicle is travelling in dependence on a signal indicative a terrain mode automatically selected in dependence on sensed vehicle and/or environmental parameters.

In particular, when the vehicle is driving on rough surfaces, if the user attempts to increase the target set-speed to a value which, if the driver is inexperienced, may set be inappropriate to the terrain over which the vehicle is travelling. By inappropriate it is meant that the user input target set-speed may be such that vehicle composure is affected.

Automatically controlling the speed of the vehicle to a vehicle control speed in dependence on an input target set-speed may further comprise: means for limiting the maximum input target set-speed in dependence upon said at least one of the instantaneous vehicle speed and the terrain over which the vehicle is travelling.

By applying a variable limit to the maximum set-speed value that the user can input the system may use the set-speed as the vehicle control speed. A signal can then be output to the user, for example via an HMI, to indicate to the user that the target set-speed has been temporarily capped. This may have additional educational benefit to the driver as to appropriate vehicle speeds in certain driving conditions.

Optionally limiting the maximum input target set-speed may comprise the system defining a maximum $\Delta$ V_set in dependence upon said at least one of the instantaneous vehicle speed and the terrain over which the vehicle is travelling, where $\Delta$ V_set is the difference between an existing target set-speed, and a new user input target set-speed. The maximum value of $\Delta$ V_set may be reduced in dependence upon the instantaneous torque being applied to the at least one of the plurality of wheels.

It will be appreciated that values such as $\Delta$ V_set that are determined in dependence on specific conditions or parameters may be calculated by means of an algorithm, or alternatively the correlations may be generated either theoretically or empirically and stored in look up tables stored in a memory means of the system and recoverable therefrom for use by the system The vehicle speed control system may further comprise means to reduce the target set-speed in dependence upon the vehicle control speed, in particular in the circumstance wherein a target set speed already exists in the system and the driver presses the resume button when attempting to overcome an obstacle.

In this manner if the control system determines that the vehicle control speed should be less than the target set-speed, it can reduce the target set-speed. The target set-speed may be reduced to the control speed. In this manner the speed to which the vehicle is controlled is manipulated by changing the target set-speed, and then controlling to that target set speed. This allows the vehicle to continue to control to the target set-speed, but allows for the target set-speed to be manipulated where appropriate without direct intervention by the user.

Optionally the target set-speed may be reduced to:

vehicle control speed+$\Delta V$_set_max wherein $\Delta$ V_set_max defines a maximum value by which the target set-speed is allowed to exceed the control speed at a given vehicle speed and/or terrain.

This allows the target set-speed to be reduced so that it is within the allowable margin of the control speed. In this manner the actual target set-speed may be automatically reduced and once the obstacle is overcome, the user can then increase the target set-speed if desired. In this manner, not only is the vehicle control speed reduced when appropriate but as the target set-speed is also reduced, after the event causing the reduction of the vehicle control speed has passed, a positive input is required by the user to confirm their desire to accelerate the vehicle above the maximum target set-speed deemed appropriate during the event in question. This allows additional time for the driver to retain assess the prevailing conditions and prevents the vehicle immediately resuming the pre-event target set-speed to the detriment of vehicle composure.

According to a further aspect of the invention, for which protection is sought, there is provided a control system for a vehicle having a plurality of wheels, the control system configured to automatically control the speed of the vehicle in dependence on an input target set-speed and comprising: means for receiving a user input of a target set-speed at which the vehicle is intended to travel comprising an input means to enable the user to incrementally increase or decrease the target set-speed; means for applying torque to the at least one of the plurality of wheels for propelling the vehicle at the vehicle control speed; and wherein the means for receiving a user input of a target set-speed is configured to increase or decrease the target set speed upon each actuation of said input means by an incremental value, and wherein the control system is configured to determined said incremental value in dependence upon at least the terrain over which the vehicle is travelling.

The control system may further comprise a terrain mode selection interface for receiving a user input of the terrain over which the vehicle is travelling, and wherein said incremental value is dependent upon a signal indicative of the terrain mode selected by the user. Alternatively the control system may further comprising an automatic terrain mode selection means comprising a plurality of vehicle and/or environmental sensors and configured to selecting an automatic terrain mode in dependence upon said vehicle and/or environmental sensors, and wherein said incremental value is dependent upon a signal indicative of the automatically selected terrain mode.

The control system may be configured to further determine said incremental value further in dependence upon one of: the speed at which the vehicle is travelling; and the target set-speed, for example the lower the speed at which the vehicle is travelling or the lower the target set-speed, the smaller the incremental value may be.

The invention also provides a vehicle having a system as described hereinabove.

According to a further aspects of the invention for which protection is sought there are provided methods for performing the functionality of the system and a memory device which comprises a carrier medium carrying a computer-readable code for controlling the vehicle to carry out the method described below.

It will be appreciated that preferred and/or optional features of any one aspect of the invention may be incorporated alone or in appropriate combination within the any other aspect of the invention also.

BRIEF DESCRIPTION OF THE DRAWINGS

The invention will now be described by way of example only with reference to the following figures in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
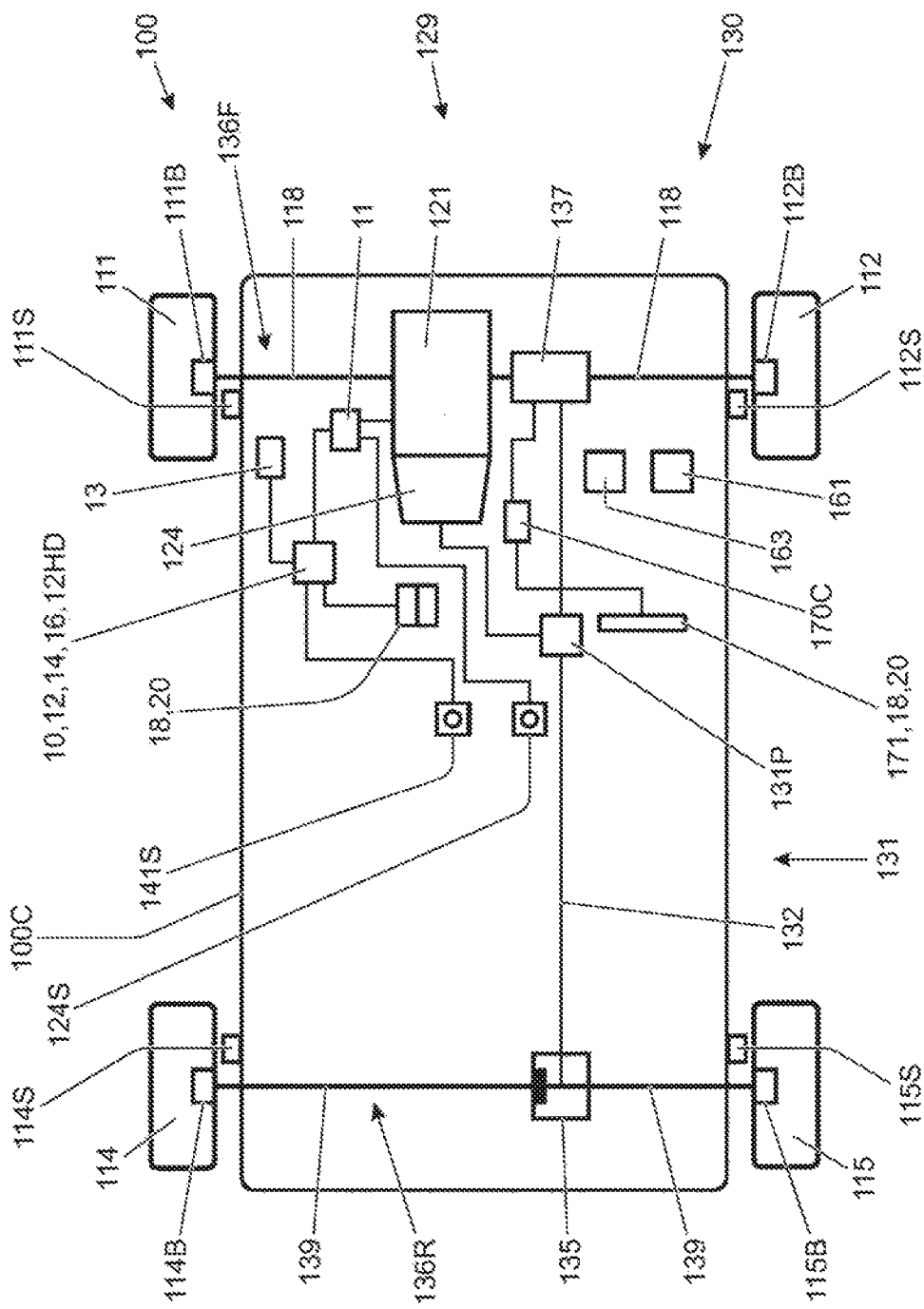
FIG. 1 is a schematic illustration of a vehicle according to an embodiment of the invention in plan view.
Figure 2:
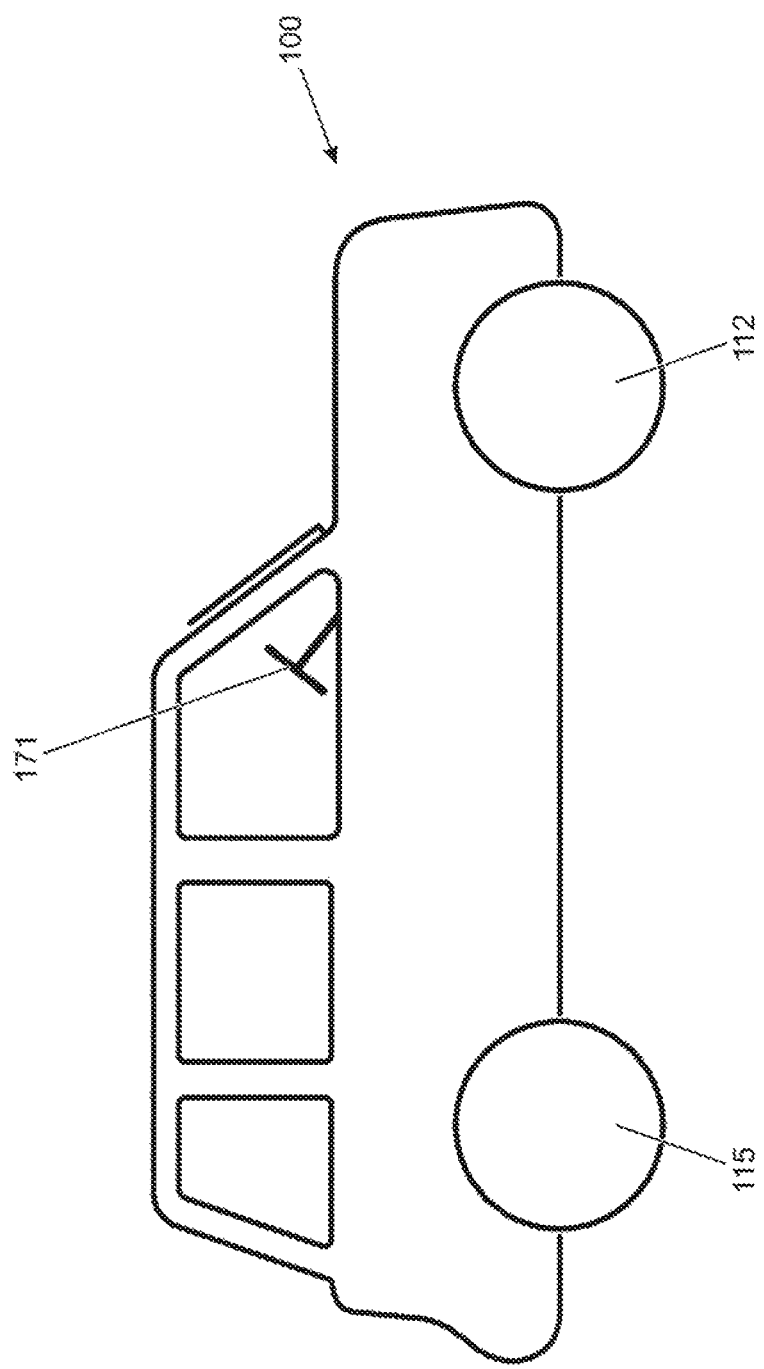
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
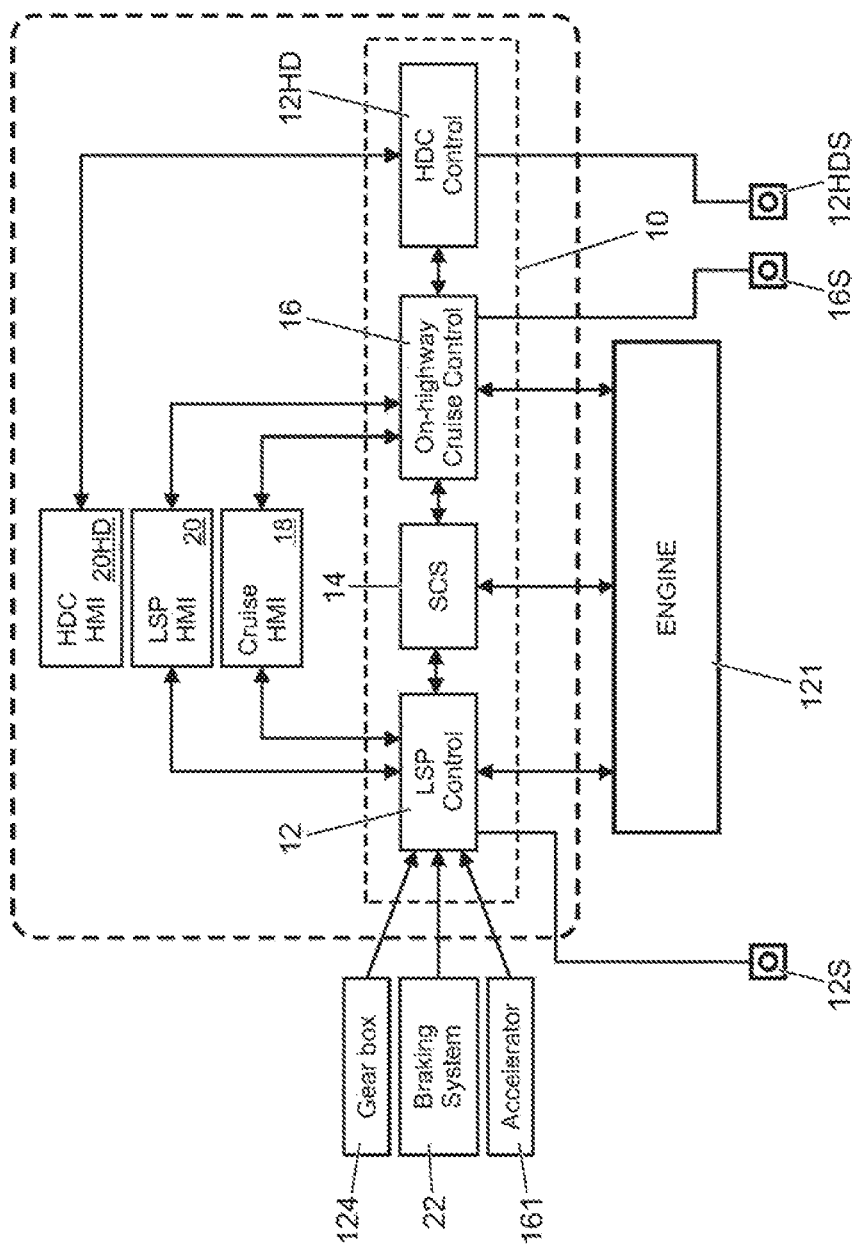
FIG. 3 is a high level schematic diagram of an embodiment of the vehicle speed control system of the present invention, including a cruise control system and a low-speed progress control system.

A control system for the vehicle engine 121 includes a central controller 10, referred to as a vehicle control unit (VCU) 10, the powertrain controller 11, a brake controller 13 and a steering controller 170C. The brake controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3 and a stability control system (SCS) 14. The SCS 14 improves the safety of the vehicle 100 by detecting and managing loss of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block an Anti-Lock Braking System (ABS) function block and a Hill Descent Control (HDC) function block. These function blocks are implemented in software code run by a computing device of the VCU 10 and provide outputs indicative of, for example, DSC activity, TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

Figure 5:
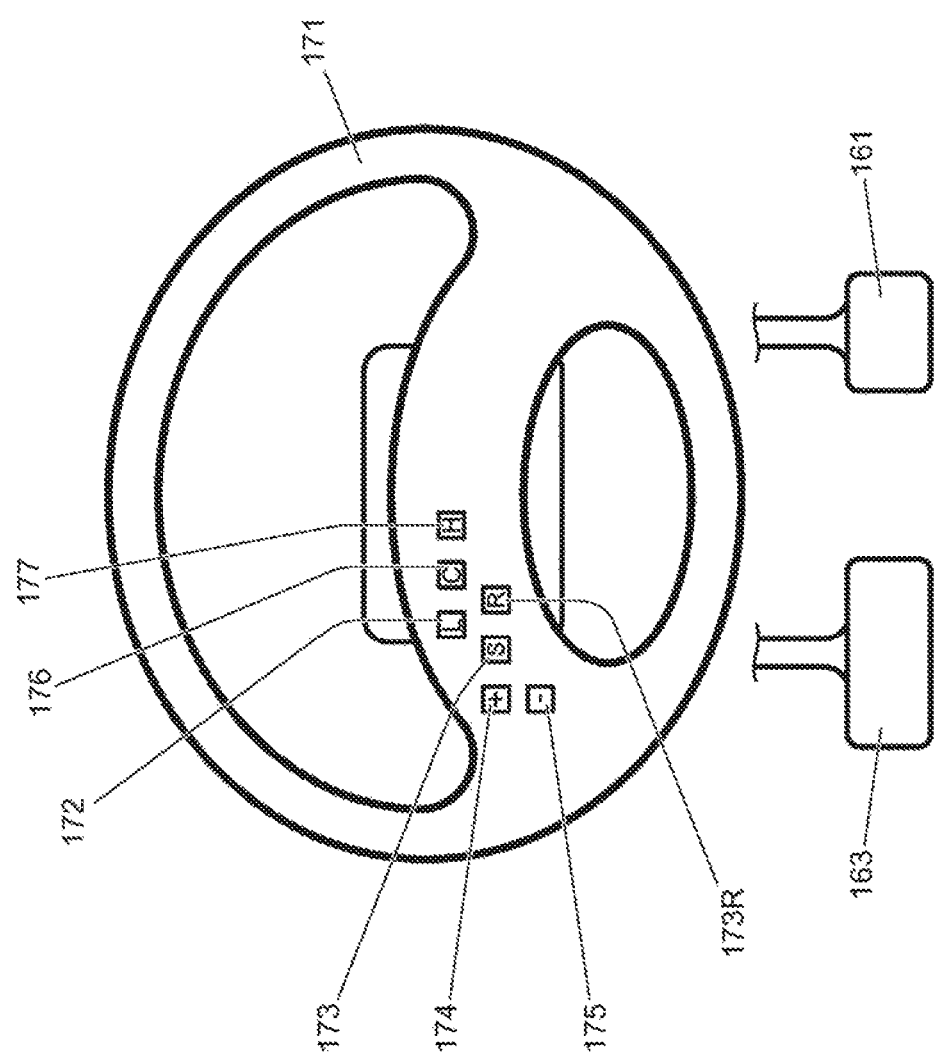
FIG. 5 illustrates a steering wheel and brake and accelerator pedals of a vehicle according to an embodiment of the present invention.

As noted above the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed.

The LSP control system 12 is configured to allow a user to input a desired value of set-speed parameter, LSP_set-speed (alternatively referred to herein as target set-speed) to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behavior when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the 47 '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC function block of the VCU 10 forms part of a HDC system 12HD. When the HDC system 12HD is active, the system 12HD controls the braking system 22 (of which the ABS function block forms part) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system is active, the HDC system 12HD controls the braking system 22 (FIG. 3) to prevent vehicle speed from exceeding the HDC_set-speed. In the present embodiment the HDC system 12HD is not operable to apply positive drive torque. Rather, the HDC system 12HD is only operable to apply negative brake torque.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate. The rate is set as 1.25 ms-2 in the present embodiment, however other values are also useful. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored.

It is to be understood that the VCU 10 is configured to implement a known Terrain Response® (TR) system of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving mode suitable for driving slowly over a rocky surface; and a 'mud and ruts' driving mode suitable for driving in muddy, rutted terrain. Other driving modes may be provided in addition or instead.

In some embodiments, the LSP control system 12 may be in either one of an active condition, a standby condition and an 'off' condition. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the off condition the LSP control system 12 is not responsive to input controls until the LSP control system selector button 172 is depressed.

In the present embodiment the LSP control system 12 is also operable to assume an intermediate condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. Other arrangements are also useful.

With the LSP control system 12 in the active condition, the user may increase or decrease the vehicle set-speed by means of the '+' and '−' buttons 174, 175. In addition, the user may optionally also increase or decrease the vehicle set-speed by lightly pressing the accelerator or brake pedals 161, 163 respectively. In some embodiments, with the LSP control system 12 in the active condition the '+' and '−' buttons 174, 175 may be disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode. In the intermediate mode, if the driver releases the accelerator pedal 161 whilst travelling above 30 kph the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active condition in which it is operable to apply positive drive torque via the powertrain 129, as well as brake torque via the powertrain 129 (via engine braking) and the braking system 22 in order to control the vehicle in accordance with the LSP_set-speed value. If no LSP set-speed value has been set, the LSP control system 12 assumes the standby mode.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is travelling.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 4:
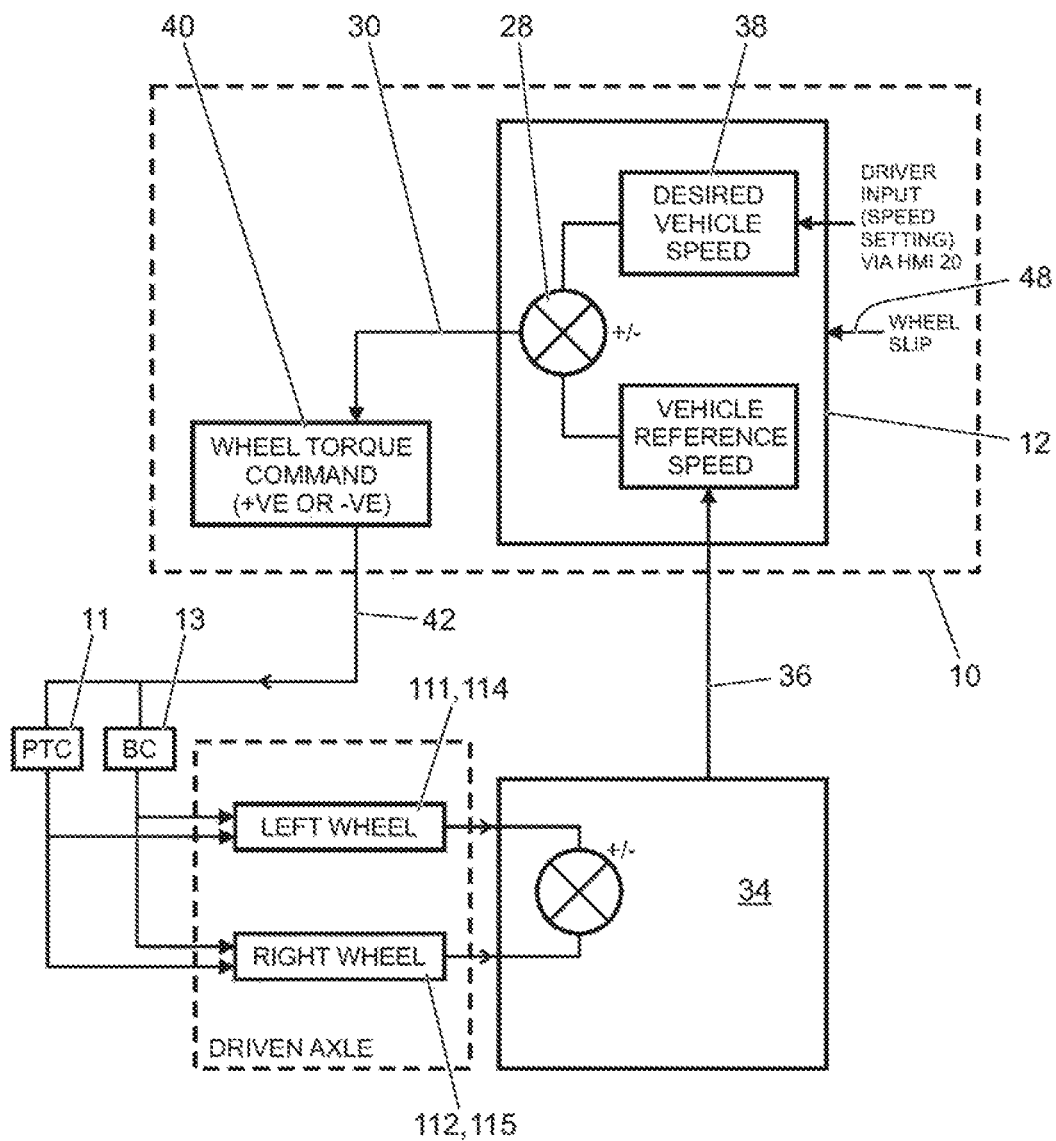
FIG. 4 is a schematic diagram of further features of the vehicle speed control system in FIG. 3.

FIG. 4 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed 38 (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing powertrain torque delivered to a wheel and/or by increasing a braking force on a wheel. It is to be understood that in some embodiments in which a powertrain 129 has one or more electric machines operable as a generator, negative torque may be applied by the powertrain 129 to one or more wheels by the electric machine. Negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the powertrain controller 11 and brake controller 13 which in turn control a net torque applied to the vehicle wheels 111-115. The net torque may be increased or decreased depending on whether the evaluator unit 40 demands positive or negative torque. In order to cause application of the necessary positive or negative torque to the wheels, the evaluator unit 40 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle at the required speed, but in another embodiment torque may be applied to the wheels collectively to maintain the required speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 4, this may be implemented by providing a wheel slip event signal 48 to the LSP control system 12 which is then managed by the LSP control system 12. In the embodiment shown in FIG. 1 the SCS 14 generates the wheel slip event signal 48 and supplies it to the LSP control system 12 and cruise control system 16.

A wheel slip event is triggered when a loss of traction occurs at any one of the vehicle wheels. Wheels and tires may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation in such conditions can be a difficult and often stressful experience for the driver and may result in an uncomfortable ride.

The vehicle 100 is also provided with additional sensors (not shown) which are representative of a variety of different parameters associated with vehicle motion and status. These may be inertial systems unique to the LSP or HDC control system 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle is travelling.

The sensors (not shown) on the vehicle 100 include, but are not limited to, sensors which provide continuous sensor outputs to the VCU 10, as mentioned previously and as shown in FIG. 3, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The front wheels 111, 112 in combination with the front drive shafts 118 and front differential 137 may be referred to as a front axle 136F. The rear wheels 114, 115 in combination with rear drive shafts 139 and rear differential 135 may be referred to as a rear axle 136R.

The wheels 111, 112, 114, 115 each have a respective brake 111B, 112B, 114B, 115B. Respective speed sensors 111S, 112S, 114S, 115S are associated with each wheel 111, 112, 114, 115 of the vehicle 100. The sensors 111S, 112S, 114S, 115S are mounted to a chassis 100C of the vehicle 100 and arranged to measure a speed of the corresponding wheel.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the illustrated embodiment is described in further detail in our co-pending patent application nos. GB1111288.5, GB1211910.3 and GB1202427.9, the contents of each of which is incorporated herein by reference.

The nature of the terrain over which the vehicle is travelling (as determined by reference to the selected control mode) may also be utilized in the LSP control system 12 to determine an appropriate increase or decrease in vehicle speed. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed, a visual indication of the speed constraint is provided to the user via the LSP HMI 20 to indicate that an alternative speed has been adopted.

B-722: ATPC-Set-Speed Adjustment Management at Low Speed when Encountering of an Obstacle In the system described above when a vehicle encounters an object or obstacle such as a boulder, curb, or log, especially when travelling at very low speeds, it may temporarily stop as the torque previously being delivered to the wheels is insufficient to drive the vehicle over the obstacle and there is a slight time lag as the torque is increased. Alternatively the driver may manually slow and stop the vehicle as it encounters the object prior to driving the vehicle over the object. In a scenario where the vehicle is stopped, or substantially at a stand-still with the leading wheels adjacent an obstruction, if the driver increases the LSP_set-speed, for example if he believes that the vehicle needs a higher set-speed to overcome the object, or pressed the LSP resume button to re-engage LSP control at the previously saved LSP_set-speed, then once the vehicle crests the object it will accelerate aggressively up to the selected LSP_set-speed due to an artificially and unintentionally high disparity between the instantaneous speed on overcoming the obstacle and the user increased or resumed LSP_set-speed. As the torque at the point of cresting the object will be high, and as there is a large disparity between the current vehicle speed and the LSP_set-speed then the vehicle may surge forwards at a speed in a manner not intended by the driver. This may be detrimental to vehicle composure.

To overcome this problem, the control system of the vehicle controls the speed of the vehicle to a vehicle control speed in dependence upon LSP_set-speed and it will be appreciated that in many driving conditions the vehicle control speed will be the LSP_set-speed. However, the vehicle control speed may vary from the LSP_set-speed, in particular the vehicle control speed may be reduced if the vehicle is travelling at a very low speed or is starting from rest. Furthermore the torque request signal may be used as an input upon which the reduction in the vehicle control speed is calculated. In this manner the speed to which the vehicle is controlled is reduced when the vehicle is substantially at a standstill and a high torque is being requested. In this manner, when the obstacle resulting in the high torque request is overcome there will be only a small difference between the vehicle speed and the vehicle control speed and the result will be a rapid reduction in the positive torque being delivered to the wheels, thereby allowing the vehicle to move forward in a more composed manner with vehicle acceleration being controlled in dependence on a detected obstacle. Effectively therefore an at least temporary cap is applied to the acceleration.

In an embodiment the LSP_set-speed may be maintained and once the obstacle is overcome and the torque is reduced, the vehicle control speed may automatically increase back up to the LSP_set-speed along a prescribed acceleration profile, however as the vehicle control speed is a function of the torque this will only occur once the torque has been reduced and thereby prevent any sudden or forceful vehicle motion as it negotiates and overcomes the obstruction. The control system may also have a delay prior to increasing the vehicle control speed back towards the LSP_set-speed. This is particularly beneficial as if the leading wheels have passed over the object it is likely that the trailing wheels will also encounter the same object and accordingly it may be beneficial to maintain a reduced vehicle control speed until the rear wheels have also overcome the obstacle. Further, the delay will give the driver time to assess the terrain in front of the obstacle.

In another embodiment the system may actually reduce the LSP_set-speed, and only allow the vehicle to resume progress at a higher speed in response to a user input to increase the LSP_set-speed. The LSP_set-speed may be reduced to the vehicle control speed or alternatively the LSP_set-speed may be reduced to a value below its previous value but above the vehicle control speed by a value of Δ V_set_max, such that:

reduced LSP_set-speed=vehicle control speed+ ΔV_set_max, where Δ V_set_max defines a maximum value by which the target set-speed (LSP_set-speed) is allowed to exceed the vehicle control speed for a given instantaneous vehicle speed. In this manner, after cresting an object, the vehicle will progress at the reduced vehicle control speed to which the LSP_set-speed has been temporarily adjusted until the driver takes positive action to increase the speed.

As when the vehicle is at a stand-still or is a virtual stand-still, i.e. it is only travelling very slowly, it may be advantageous to limit the amount by which the driver can increase the LSP_set-speed so as to at least in part mitigate the problem of large discrepancies between actual vehicle speed and LSP_set-speed, in particular when large torques are being, or will be, applied to the wheels. Accordingly, in a control system of an embodiment of the invention, changes to the LSP_set-speed may be limited in dependence upon, or as a function of, the instantaneous vehicle speed. In particular, a controller of the system may also limit the maximum input LSP_set-speed in dependence upon the terrain over which the vehicle is travelling. Limiting the maximum input target set-speed may be effected by the system defining a maximum Δ V_set in dependence upon the instantaneous vehicle speed, where Δ V_set is the difference between an existing target set-speed, and a new user input target set-speed. The system will therefore not allow the user to input a LSP_set-speed that would result in Δ V_set exceeding the maximum Δ V_set.

Figure 6:
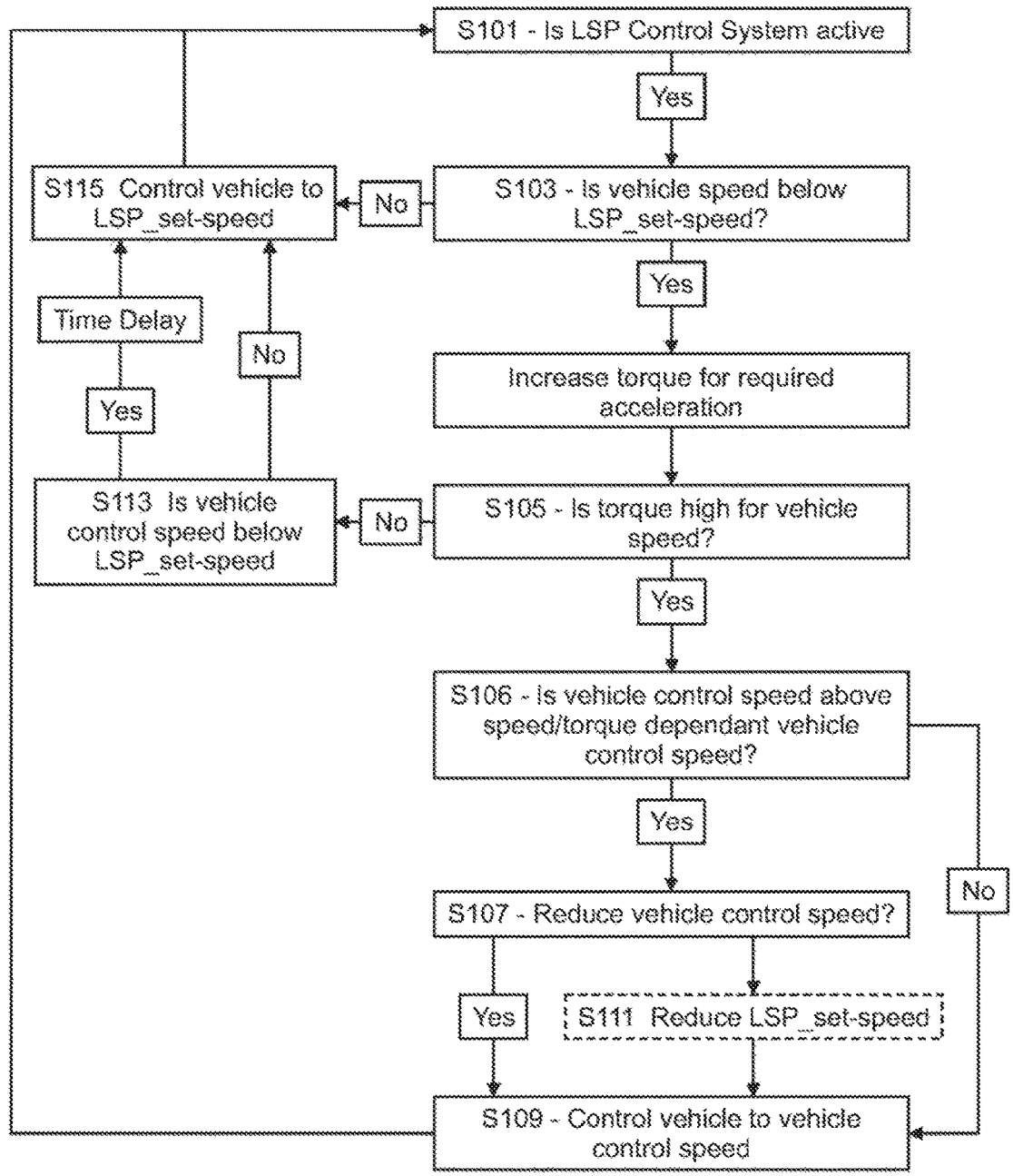
FIG. 6 is a flowchart illustrating operation of a vehicle according to one embodiment of the present invention.

Operation of a control system function according to an embodiment of the invention will now be described by reference to flow diagram FIG. 6.

At step S101 the control system verifies if the LSP control system is in an active configuration. If the control system determines that the LSP control system is in an active configuration then the method continues to step S103.

At step S103 the control system determines the actual vehicle speed, for example by reference to wheel speed sensors, GPS data or the like, and determines if the vehicle speed is below the LSP_control_speed. If the vehicle speed is not below the LSP_control_speed the method progresses to step S115 as described below. If the vehicle speed is below the LSP_control_speed the method progresses to step S105.

At step S105 the control system determines if the torque request signal is high for the vehicle speed (and/or for the difference between the actual vehicle speed and the LSP_set-speed). If the torque request signal is not high for the vehicle speed then this is indicative of the vehicle is not currently trying to overcome an obstruction and is merely attempting to reach its LSP_set-speed, and the method progresses to step S113 which is described in more detail below.

If the torque request signal is high for the vehicle speed (and/or for the difference between the actual vehicle speed and the LSP_set-speed) then that can be taken as indicative of the vehicle attempting to traverse or overcome an obstacle that requires substantially more drive torque than driving across a substantially flat terrain, and the method progresses to step S106.

At step S106 the system determines if the vehicle control speed is above a speed and/or torque dependant target vehicle control speed. If the system determines that the vehicle control speed is not above a speed and/or torque dependant target vehicle control speed then the method progresses to step S109. If the system determines that the vehicle control speed is above a speed and/or torque dependant target vehicle control speed then the method progresses to step S107.

At step S107 wherein the vehicle control speed is reduced. Optionally the method may, at this time, include step S111 wherein the LSP_set-speed is also reduced. The vehicle control speed is reduced to a value that is dependent upon the amount of torque being requested. The method then progresses to step S109.

At step S109 the control system controls the vehicle to the vehicle control speed and then loops back to step S101, and the control loop continues.

If at Step 105 the torque is not high for the given speed, then the method progresses to step S113 as stated above. At step S113 the system determines if the vehicle control speed is below the LSP_set-speed. If so, this is indicative that the vehicle control speed had been reduced in a previous loop of the method, i.e. the vehicle encountered an obstacle and has now negotiated the obstacle. If the system determines that the vehicle control speed is below the LSP_set-speed then a time delay is introduced prior to the method progressing to step S115. In one embodiment the time delay may take into consideration the wheelbase of the vehicle and the vehicle speed to ensure that the time delay is sufficient that if a trailing wheel of the vehicle will also traverse the same obstacle then the vehicle does not accelerate until all wheels have cleared the obstacle. Other time delays may be useful. At step S113, if the system determines that the vehicle control speed is not below the LSP_set-speed then this is indicative of the vehicle accelerating to a LSP_set-speed under normal conditions and the method progresses directly to step S115 without the time delay.

At step S115 the control system controls the vehicle to obtain and maintain the LSP_set-speed.

B-722 Terrain Type and Speed Adaptation for ATPC Torque Control to Enhance Composure When a driver cannot see, via the vehicle HMI interface, the LSP_set-speed that they set using the cruise control buttons 174, 175 it is possible for them to press and hold the "set +" button and set a target speed that is much higher than the current vehicle speed. This may be because the actual speed is not displayed or because the driver is concentrating on controlling the direction of the vehicle and is not looking at the vehicle display.

This can result in the vehicle accelerating to the target speed which may be set unintentionally high, which may feel disconcerting to the driver as they do not know when the vehicle is going to stop accelerating.

As the set + button is pressed the vehicle speed is incrementally increased in a time dependent manner, for example 1 mph for every second the button is pressed. Where the vehicle accelerates at a slower rate than the LSP_set-speed is increasing a disparity may occur between the current vehicle speed and the LSP_set-speed when the driver releases the set + button, and the vehicle may then continue to accelerate in a manner unexpected, or more than anticipated by the driver. This can be mitigated in part by operating the vehicle speed such that the vehicle accelerates while the + button is being depressed and the system then limits any additional speed increase after the set + button is released to a fixed value, irrespective of the value the LSP_set-speed should have risen to based purely on the amount of time the set + button was pressed for. This prevents the vehicle accelerating faster than intended once the button is released due to an unintentionally high set speed. In particular this may occur when driving off road in variable conditions as the vehicle may be limited in its rate of acceleration by such factors slip events occurring at vehicle wheels. In such circumstances there is an increased likelihood that the driver will be concentrating on controlling the trajectory of the vehicle rather than watching the vehicle HMI interface which may be displaying the set speed. The limiting of any additional acceleration therefore binds the target speed (LSP_set-speed) to the vehicle speed so the vehicle behavior on a press and hold of the + button feels like the driver is accelerating the car whilst holding the button. On release the car accelerates the last, limited, amount to the target.

However, during low speed driving this method of using a capped additional speed increase when the set + button is released can still inadvertently cause loss of composure as the last part of acceleration may be result in a LSP_set-speed that is too great for the terrain type, especially on rough surfaces. The driver may therefore inadvertently press and hold the set + button causing the vehicle to accelerate to a speed that is uncomfortably fast for the surface.

In order to overcome this, a vehicle speed control system may be configured to automatically control the speed of the vehicle to a vehicle control speed by way of the LSP_set-speed which is controlled as a function of at least one of the instantaneous vehicle speed and the terrain over which the vehicle is travelling.

In one arrangement the vehicle comprises a TR controller via which the terrain mode can be set by the driver. The vehicle speed control system can control the vehicle control speed, in dependence upon the LSP_set-speed, as a function of the terrain over which the vehicle is travelling in dependence on a signal indicative a user selected terrain mode. Alternatively the vehicle may have an automatic terrain response (TR) controller as described herein above and the system may control the vehicle control speed, in dependence upon the LSP_set-speed, as a function of the terrain over which the vehicle is travelling in dependence on a signal indicative a terrain mode automatically selected in dependence on sensed vehicle and/or environmental parameters.

The vehicle may be controlled as described above wherein the vehicle accelerates as the driver holds the set + button and when the driver releases the set + button. If the LSP_set-speed is greater than the current vehicle speed controller may set the LSP_set-speed the current vehicle speed plus a maximum allowable additional amount wherein said maximum additional amount is a function the instantaneous vehicle speed and the terrain over which the vehicle is travelling.

The system may cap the maximum LSP_set-speed to which the set + button will set the LSP_set-speed, and therefore to which the control system will accelerate the vehicle, in dependence upon the at least one of the instantaneous vehicle speed and the terrain over which the vehicle is travelling. In this way the driver cannot inadvertently request the vehicle accelerate and be controlled to a LSP_set-speed that is greater than that appropriate for the terrain which is being traversed. The maximum LSP_set-speed (LSP_set-speed_max) may be defined as an absolute amount in dependence on the at least one of the instantaneous vehicle speed and the terrain over which the vehicle is travelling. Alternatively the system may limit the maximum input target set-speed by defining a maximum $\Delta$ V_set based on the at least one of the instantaneous vehicle speed and the terrain over which the vehicle is travelling, where $\Delta$ V_set is the difference between an existing target set-speed, and a new user input target set-speed; i.e., the system does not allow more than a specified addition to the current LSP_set-speed to be requested and that difference is dependent upon the at least one of the instantaneous vehicle speed and the terrain over which the vehicle is travelling.

Figure 7:
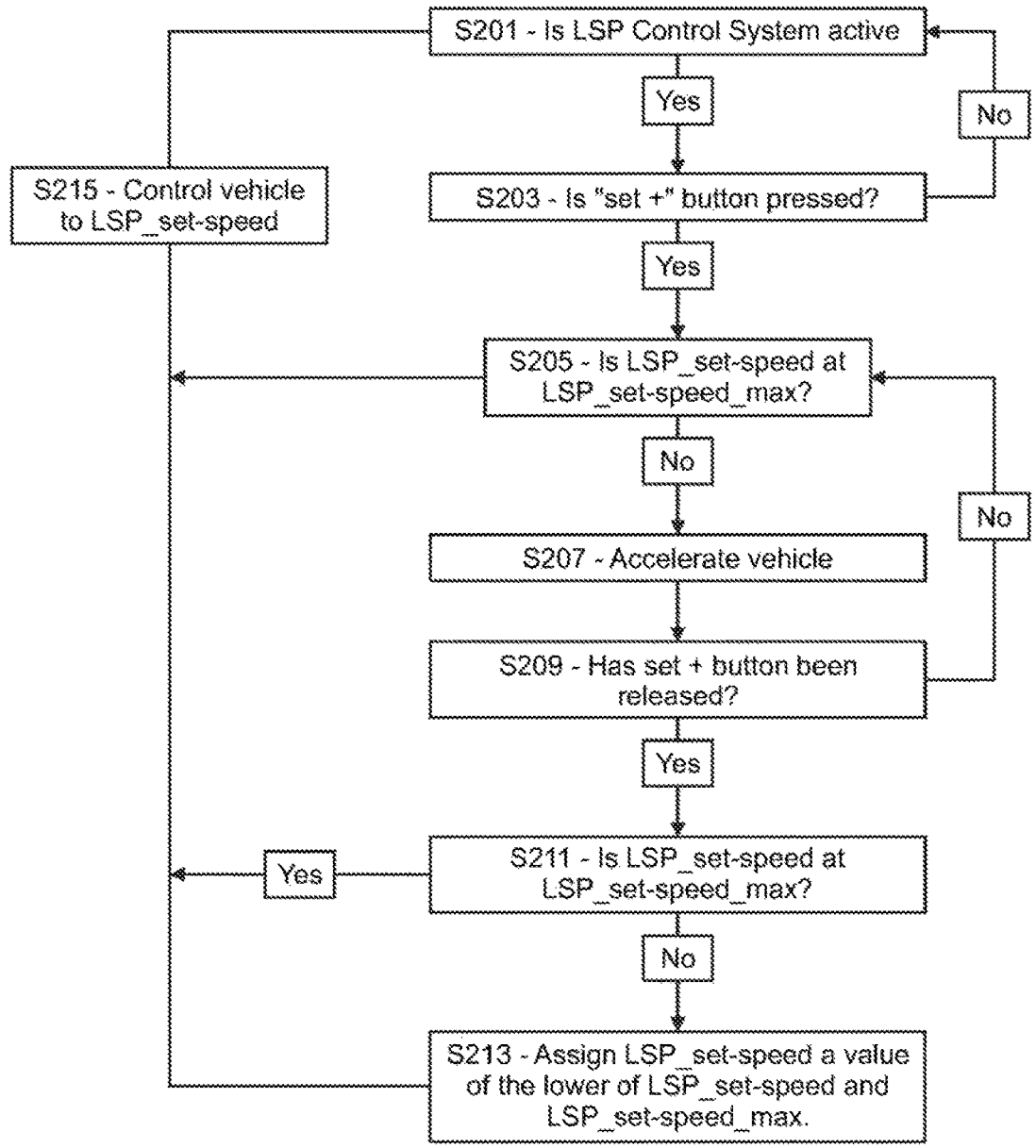
FIG. 7 is a flowchart illustrating operation of a vehicle according to another embodiment of the present invention.

Operation of a control system function according to an embodiment of the invention will now be described by reference to flow diagram FIG. 7.

At step S201 the control system verifies if the LSP control system is in an active configuration. If the control system determines that the LSP control system is in an active configuration then the method continues to step S203.

At step S203 the system determines if the driver is pressing the Set + button. If the set + button is not being pressed the method loops back to step S201. If the set + button is being pressed the method continues to step S205.

At step S205 the system determines of the LSP_set-speed is already at the maximum allowable set-speed LSP_set-speed_max. To perform this functionality the controller acquires data relating one or both of the instantaneous vehicle speed and the terrain type over which the vehicle is traversing. The Terrain type is obtained by the TR controller and may be a user input TR mode, or may be an automatically determined TR mode. The controller then looks up a value of LSP_set-speed_max, correlating to the identified instantaneous vehicle speed and/or terrain type, in a look-up table in a memory of the system. If the LSP_set-speed is equal to the LSP_set-speed_max for the prevailing conditions then no further increase to the LSP_set-speed and no acceleration are permitted. The method then continues to step S215 wherein the system controls the speed of the vehicle to the LSP_set-speed. If the LSP_set-speed is below the LSP-set_speed_max then the system continues to step S207 wherein the vehicle incrementally accelerates and the LSP_set-speed is increased to match the increased vehicle speed. The method then continues to step S209.

At step S209 the system determines if the set + button has been released or if it continues to remain pressed. If the set + button remains pressed the method loops back to step S205. In this manner, while the set + button remains pressed the control system will increase the torque at the wheels to accelerate the vehicle. The rate of acceleration may be a predetermined rate and may for example be dependent upon factors such as the TR mode in which the vehicle is operating, and other factors such as vehicle attitude and detected slip events. Other factors in determining appropriate acceleration may be useful. The rate at which the torque is increased (i.e. the vehicle acceleration) may vary depending on one or both of the instantaneous speed and the TR mode in which the vehicle is operating. This loop will continue until either the LSP_set-speed_max is reached, or until at step S209 the system determines that the set + button has been released. If at step S209 the system determines that the set + button has been released the method continues to step S211.

At step S211 a further check is made as to whether the LSP_set-speed_max has been reached. If so the method progressed to step S215 and the system controls the vehicle to the LSP_set-speed. If however the LSP_set-speed_max has not been reached then the method continues to step S213.

At step S213, upon release of the set + button the vehicle will assign the LSP_set-speed a value equal to the lower of LSP_set-speed and LSP_set-speed_max, wherein LSP_set-speed_max is defined by current vehicle speed+ $\Delta$ V_set_max, where $\Delta$ V_set_max defines a maximum value by which the LSP_set-speed is allowed to exceed the instantaneous vehicle speed for the prevailing terrain type; i.e. if the LSP_set-speed is higher than the current vehicle speed when the set + button is released the vehicle will continue to accelerate towards the LSP_set-speed, the magnitude of the continued acceleration being determined in dependence on the speed of the vehicle and/or the prevailing TR mode. The value of $\Delta$ V_set_max is obtained by the system from look up tables stored in a memory of the control system. The method then continues to step S215 wherein the vehicle is controlled to the LSP_set-speed.

Although described herein in relation to a set + button it will be recognized that when LSP control mode is operational the accelerator may be configured to act as the set + button and the above method and system may substitute activation of the set + button with the accelerator being pressed when the vehicle is operating in LSP control mode.

B724-ATPC Variable Set Speed Incremental Adjustment Based on Prevailing Terrain Type.

It has been recognized that where a vehicle is used for traversing varied terrain, the vehicle response to same command input given to the vehicle may result in a different behavior in dependence upon the prevailing terrain. In particular due to, for example, the different drag imposed on the vehicle by different surfaces, and the different surface frictions, as the vehicle accelerates, by application of an increased positive torque to the driving wheels, and decelerates by a reduction in positive torque or an application of negative torque to the driving wheels, the response of the vehicle may be different depending on the terrain type. Furthermore, for different terrain types different levels of driver control will be needed due to the nature of the terrain. For example, when driving on a hard flat surface such as tarmac or concrete driver workload is relatively low, whereas when crossing a boulder field strewn with rocks of different sizes, the driver workload would be relatively high. For these reasons, at least, it may be desirable for the vehicle to respond differently to the same driver input in dependence upon the terrain type over which the vehicle is travelling so as to aid control of the vehicle, enhance composure, and reduce driver workload and fatigue when travelling off-road.

As described hereinabove, a low speed progress control system is proposed that controls the speed of the vehicle at speeds below those controlled by standard cruise control systems and which is particularly suited to off highway driving conditions.

The system controls the speed of the vehicle to a target set-speed LSP_set-speed that can be set and increased/decreased by, for example, the driver by pressing set + and set − buttons to incrementally increase or decrease the set speed.

In this aspect of the disclosed embodiments, a vehicle speed control system for a vehicle having a plurality of wheels is proposed, the vehicle speed control system is configured to automatically control the speed of the vehicle in dependence on an input target set-speed. The system comprises a means for receiving a user input of a target set-speed at which the vehicle is intended to travel; a means for applying torque to the at least one of the plurality of wheels for propelling the vehicle at the vehicle control speed; and a means for controlling the target set-speed in dependence upon at least one if the instantaneous vehicle speed and the terrain over which the vehicle is travelling.

The means for controlling the target set-speed comprises an input means to enable the user to incrementally increase and/or decrease the target set-speed upon each actuation of said input means by an incremental value. The control system is configured to determine said incremental value in dependence upon said at least one if the instantaneous vehicle speed and terrain over which the vehicle is travelling.

The means for controlling the vehicle control speed in dependence upon the terrain over which the vehicle is travelling comprises a set + button 174 and a set − button 175 disposed on the steering wheel 171 of the vehicle.

Each time the set + or the set − button is pressed the control system increases or decreases the LSP_set-speed by a predetermined amount. In an alternative arrangement the set + or the set − button may increase or decrease the amount of torque requested by the control system by a predetermined amount, resulting in an increase in the speed. The LSP_set-speed may then be reset to the new vehicle speed.

The predetermined amount by which the set + and/or set − increase or decrease the LSP_set-speed, or the torque request, are determined in dependence on the terrain over which the vehicle is travelling.

As described above the vehicle includes a TR controller that controls the vehicle set up in dependence upon the terrain over which the vehicle is travelling. The TR mode may be input by the user or may be automatically determined and set by the TR controller in response to data gathered from a plurality of vehicle and/or environmental sensors disposed on the vehicle.

In one arrangement the control system may set the set + and set − increments in dependence upon a signal indicative of a user selected terrain mode. Alternatively the control system may set the set + and/or set − increments in dependence upon a signal indicative a terrain mode automatically selected in dependence on sensed vehicle and/or environmental parameters.

The control system includes a memory means which contains a look up table correlating the + and/or − increment magnitudes to associated or appropriate TR modes. In one embodiment of this aspect of the invention the control system may verify in which TR mode the vehicle is operating when the set + or set − button is selected and look up the appropriate increment magnitude for that mode. Alternatively the setting or selection of the TR mode may automatically cause the control system to look up the appropriate increment magnitude and store that for use upon activation of the set + or set − buttons.

In particular the set + increments may be lower for more some TR modes, in particular those TR modes which may correlate to greater suspension travel or large torque changes. For example the TR modes may include a "Mud and Ruts" mode and a "Rock Crawl" mode and the set + increments may be less for these modes than for other modes, e.g. sand; grass, gravel, snow; SPO etc. In this manner when activating the set + control the amount of acceleration may be reduced in some modes so that the vehicle does not accelerate so much in response to a set + input, thereby allowing greater finesse of control in difficult terrain, resulting in improved vehicle composure. Traction may also be improved as by reducing the rate of change of LSP_set-speed the acceleration from current speed to the new LSP_set-speed will be reduced.

In some embodiments the set – control may be configured in the same manner, however, alternatively the set – control may have a separate look up table such that the set-controls can vary independently from the set + controls, or may be set to a constant value. It may, for example, be desirable for the deceleration increments to remain constant so when slowing the vehicle the driver obtains the same or a similar slowing of the vehicle in all modes.

The magnitude of the increments maybe further amended in dependence upon the instantaneous vehicle speed, in particular the increments may be smaller at lower speeds and greater at higher speeds. This may be achieved either by using look up tables correlating the TR modes and speeds to increment values, or may be achieved by applying a function of the vehicle speed to the increment value. For example:

$$\text{Increment value} = IV_{LOOKUP} \times C(V_{INST})$$

wherein $IV_{LOOKUP}$ is the IV value obtained from the look up table; $V_{INST}$ is the instantaneous speed of the vehicle and C is a constant.

It is to be understood that in some embodiments an off road speed control system may be operable in either forward or reverse driving use.

It is to be understood that the speed control system according to an embodiment of the present invention may form part of an ATPC (All-Terrain Progress Control) system, which may be arranged to work independently or in conjunction with one or more vehicle control systems arranged to optimize one or more vehicle configurations such as one or more sub-system configurations for a given terrain over which the vehicle is travelling. An example of such a system is a Terrain Response® system.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vehicle speed control system for a vehicle having a plurality of wheels, the vehicle speed control system configured to automatically control the speed of the vehicle to a vehicle control speed in dependence on an input target set-speed and comprising at least one electronic controller:

said at least one electronic controller having an input for receiving an electrical signal indicative of a user input of a target set-speed at which the vehicle is intended to travel;

said at least one electronic controller outputting a signal to apply torque to the at least one of the plurality of wheels for propelling the vehicle at the vehicle control speed;

wherein said at least one electronic controller is configured to control the vehicle control speed as a function of at least the instantaneous vehicle speed, said at least one electronic controller having an evaluator unit for evaluating the torque to be applied to at least one of the vehicle wheels and outputting a torque request signal; and said at least one electronic controller is configured to reduce the vehicle control speed as a function of the torque request signal.

2. The vehicle speed control system as claimed in claim 1, wherein the at least one electronic controller is configured to:

determine a current speed at which the vehicle is travelling;

compare the current speed with the vehicle control speed and provide an output indicative of the difference between the current speed and the vehicle control speed; and evaluate the torque to be applied to at least one of the vehicle wheels in dependence on said output indicative of the difference between the current speed and the vehicle control speed, and output the torque request signal in dependence thereon.

3. The vehicle speed control system according to claim 1 wherein the at least one electronic controller is configured to reduce the vehicle control speed as a function of the torque request signal if the instantaneous vehicle speed is in the range of 0 to 3 kilometers per hour.

4. The vehicle speed control system as claimed in claim 1, wherein the at least one electronic controller is configured to control said vehicle control speed as a function of the terrain over which the vehicle is travelling in dependence on at least one of: a signal indicative a user selected terrain mode; a signal indicative a terrain mode automatically selected in dependence on sensed vehicle parameters; or a signal indicative a terrain mode automatically selected in dependence on sensed environmental parameters.

5. The vehicle speed control system as claimed in claim 1 wherein automatically controlling the speed of the vehicle to a vehicle control speed in dependence on an input target set-speed further comprises:

the at least one electronic controller limiting the maximum input target set-speed in dependence upon said at least one of the instantaneous vehicle speed and the terrain over which the vehicle is travelling.

6. The vehicle speed control system as claimed in claim 5, wherein limiting the maximum input target set-speed comprises:

the system defining a maximum Δ V_set in dependence upon said at least one of the instantaneous vehicle speed and the terrain over which the vehicle is travelling, where Δ V_set is the difference between: one of an existing target set-speed or the instantaneous speed of the vehicle; and a new user input target set-speed.

7. The vehicle speed control system according to claim 6 wherein the maximum value of Δ V_set is reduced in dependence upon the instantaneous torque being applied to the at least one of the plurality of wheels.

8. The vehicle speed control system according to claim 1 wherein the at least one electronic controller is configured to reduce the target set-speed in dependence upon the vehicle control speed and wherein the target set-speed is reduced to vehicle control speed+ Δ V_set_max, wherein Δ V_set_max defines a maximum value by which the target set-speed is allowed to exceed the control speed at a given vehicle speed.

9. The vehicle speed control system according to claim 1 wherein:
- the system comprises an input device for receiving a user input of a target set-speed that enables the user to incrementally increase the target set-speed by pressing and holding a target set-speed + button, and wherein
- the controller is configured to incrementally increase the target set-speed while the set-speed + button is held, and, once the set-speed + button is released the controller is configured to continue to increase the target set-speed by a value determined by the controller in dependence on at least one of the instantaneous vehicle speed and the terrain over which the vehicle is travelling.

10. The vehicle speed control system according to claim 1, wherein: the system comprises an input device to enable the user to incrementally increase and/or decrease the target set-speed upon each actuation of said input device by an incremental value; and wherein
- the at least one electronic controller is configured to determine said incremental value in dependence upon at least one of: the instantaneous vehicle speed; the target set-speed; or the terrain over which the vehicle is travelling.

11. The vehicle speed control system as claimed in claim 10, further comprising a terrain mode selection interface for receiving a user input of the terrain over which the vehicle is travelling, and wherein said incremental value is dependent upon a signal indicative of the terrain mode selected by the user.

12. The vehicle speed control system according to claim 11 wherein said control system is configured to determine said incremental value further in dependence upon one of the speed at which the vehicle is travelling and the target set-speed.

13. The vehicle speed control system according to claim 12 wherein the lower the speed at which the vehicle is travelling or the lower the target set-speed, the smaller the incremental value.

14. The vehicle speed control system as claimed in claim 10, further comprising an automatic terrain mode selector comprising a plurality of vehicle and/or environmental sensors and configured to select an automatic terrain mode in dependence upon said vehicle and/or environmental sensors, and wherein said incremental value is dependent upon a signal indicative of the automatically selected terrain mode.

15. A vehicle comprising a vehicle speed control system as claimed in claim 1.

16. The vehicle speed control system according to claim 1 wherein said at least one electronic controller further controls the vehicle control speed as a function of the terrain over which the vehicle is travelling.

17. A method of automatically controlling the speed of a vehicle having a plurality of wheels at a vehicle control speed in dependence on an input target set-speed, the method comprising:
- receiving a user input of a target set-speed at which the vehicle is intended to travel;
- applying a torque to the at least one of the plurality of wheels for propelling the vehicle at the vehicle control speed;
- controlling the vehicle control speed as a function of at least the instantaneous vehicle speed,
- evaluating the torque to be applied to at least one of the vehicle wheels and outputting a torque request signal; and
- reducing the vehicle control speed in dependence on the torque request signal.

18. The method according to claim 17 further comprising controlling the vehicle control speed as a function of the terrain over which the vehicle is travelling.

19. A non-transient carrier medium carrying a computer readable code for controlling a vehicle to automatically control the speed of the vehicle to a vehicle control speed in dependence on an input target set-speed, wherein the computer readable code, when executed by an electronic processor, causes the processor to:
- receive an electrical signal indicative of a user input of a target set-speed at which the vehicle is intended to travel;
- apply a torque to the at least one of the plurality of wheels for propelling the vehicle at the vehicle control speed;
- control the vehicle control speed as a function of at least the instantaneous vehicle speed;
- evaluate the torque to be applied to at least one of the vehicle wheels and outputting a torque request signal; and
- reduce the vehicle control speed in dependence on the torque request signal.

* * * * *